United States Patent [19]

Ackerman

[11] 4,412,612
[45] Nov. 1, 1983

[54] DRIVE BELT CONNECTION FOR AN AGRICULTURAL PICKUP DEVICE

[75] Inventor: LaVern L. Ackerman, Bismarck, N. Dak.

[73] Assignee: Clark Equipment Company, Buchanan, Mich.

[21] Appl. No.: 109,706

[22] Filed: Dec. 20, 1979

Related U.S. Application Data

[63] Continuation of Ser. No. 914,247, Jun. 9, 1978, abandoned.

[51] Int. Cl.$^3$ ............................................ B65G 15/44
[52] U.S. Cl. .................................... 198/697; 198/846
[58] Field of Search ............... 198/688, 692, 693, 697, 198/699, 846, 847; 56/364

[56] References Cited

U.S. PATENT DOCUMENTS 2,570,065 10/1951 Melroe ............................... 198/510
4,202,159 5/1980 Young ................................... 56/364

Primary Examiner—Robert B. Reeves
Assistant Examiner—Douglas D. Watts
Attorney, Agent, or Firm—Mack L. Thomas

[57] ABSTRACT

An agricultural pickup device is provided in which a conveyor apron is assembled over and driven by a drive belt. The conveyor apron is drivingly attached to the drive belt by a plurality of transverse pins. The transverse pins also serve to attach pickup fingers to the apron. Each of the transverse pins are inserted through coaxial bores of a respective row of raised portions in the apron, through a coiled portion of the pickup fingers, and through an aperture in the lug portion of the drive belt.

8 Claims, 6 Drawing Figures

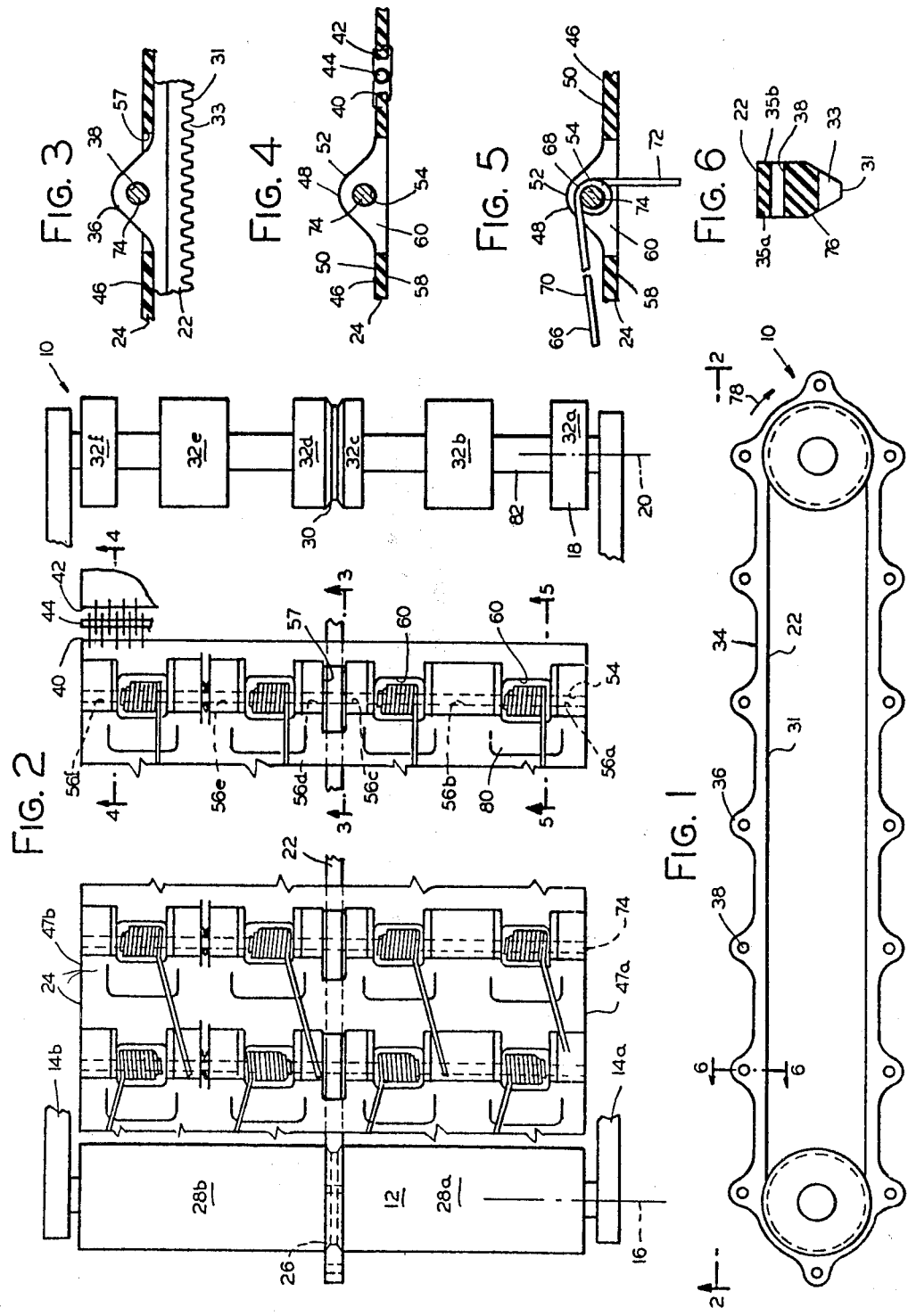

DRIVE BELT CONNECTION FOR AN AGRICULTURAL PICKUP DEVICE

This is a continuation of application Ser. No. 914,247, filed June 9, 1978, now abandoned.

BACKGROUND OF THE INVENTION

1. Field of the Invention

The present invention relates to pickup devices for agricultural equipment, and the like, wherein a conveyor belt includes material-engaging elements or pickup fingers for picking up hay or grain stalks from the ground.

2. Description of the Prior Art

Pickup devices have been used on agricultural equipment, both on windrowers wherein the pickup device is used to pick up mown hay from the ground, and on combines wherein the pickup device is used to pick up unthreshed grain from windrows on the ground. These pickup devices have included a pair of spaced-apart rollers, an endless conveyor apron circumferentially disposed around the rollers, and a plurality of pickup fingers that are attached to the apron and that project outwardly therefrom.

In U.S. Pat. No. 2,253,797, issued to Melroe, the pickup fingers, which are formed from wire, have a shape which causes the fingers to project outwardly from the conveyor apron as respective ones of the fingers progress around the smaller one of the rollers. The outward movement of the fingers is provided by the shape of the fingers, by the point of attachment of the fingers, and by localized flexing of the belt as the belt wraps around the smaller one of the rollers.

In U.S. Pat. No. 2,385,829, Melroe discloses an improved pickup device in which the rollers each include a V-belt sheave. A V-belt is placed in driving engagement with the sheaves and the conveyor apron is draped circumferentially around both a V-belt and the spaced-apart rollers. Driving engagement between the V-belt and the apron is provided by a plurality of circumferentially spaced-apart rivets which extend from the outer surface of the apron through the inner surface of the V-belt.

This second patent to Melroe also teaches a method for actuating the pickup fingers outwardly. A portion of each finger extends inwardly through respective ones of openings in the apron. Actuation of the fingers outwardly from the apron, when the fingers are proximal to one of the rollers, is achieved by engagement of these inner portions of the fingers with the roller; actuation of the fingers outwardly, when the fingers are intermediate of the rollers, is provided by a metallic structure that is inserted intermediate of the rollers; and actuation of the fingers outwardly, when the fingers pass around another of the rollers, is prevented by providing a plurality of grooves in this second roller for receiving the inner portions of the fingers without actuation thereof outwardly.

In a third patent issued to Melroe, U.S. Pat. No. 2,570,065, a pair of spaced-apart rollers, each including a V-belt shape, are provided as noted in the prior art above. Also, a V-belt is circumferentially disposed around the sheaves as was noted for the previous prior art. The distinctive portion of this reference includes a plurality of narrow and spaced-apart flat belts or conveyor apron portions which are disposed around the rollers and on opposite sides of the V-belt. A plurality of transversely disposed metal slats are then riveted to individual ones of the flat belts and to the V-belt to transmit motion from the V-belt to the individual flat belts. The pickup fingers are secured to respective ones of the metal slats.

SUMMARY OF THE INVENTION

In accordance with the broader aspects of this invention, there is provided a conveyor apparatus or pickup device which comprises a pair of roller units that are mounted on spaced-apart and substantially coplanar and parallel axes and that each include a sheave. A drive belt is wrapped around the sheaves in driving engagement thereto and includes a plurality of drive lugs that are circumferentially spaced around the outer surface of the drive belt and that project therefrom.

An endless conveyor apron includes a plurality of circumferentially spaced-apart drive lug receiving openings and is circumferentially disposed over the drive belt with respective ones of the drive lugs projecting through respective ones of the lug receiving openings.

A transverse aperture is provided in each of the drive belt lugs and a transverse bore is provided in each raised portion of each transverse row of raised portions in the apron. An opening in the apron is provided for each drive lug which extends therethrough. Each lug opening is intermediate respective raised portions of the apron in each transverse row of raised portions.

A plurality of pins are each inserted into respective ones of the apertures in the drive lugs and the respective coaxial bores in the apron, thereby drivingly securing the apron to the drive belt.

A plurality of material-engaging elements, such as pickup fingers, each include a coiled portion; and the pickup fingers are secured to the apron by being inserted into respective ones of finger-receiving openings in the apron and by the coiled portion of respective ones of the fingers encircling portions of respective ones of the pins.

It is a first object of the present invention to provide a conveyor apparatus that includes a drive belt that is drivingly wrapped over a pair of spaced-apart roller units, an apron that is wrapped around the drive belt and the spaced-apart roller units, and novel means for drivingly attaching the apron to the drive belt.

It is a second object of the present invention to provide a conveyor apparatus that includes a pair of spaced-apart roller units that each include a sheave, a drive belt that is wrapped around and drivingly engages the sheaves, an apron that is wrapped around the drive belt and the roller units, and a plurality of transverse pins that drivingly secure the apron to the drive belt.

It is a third object of the present invention to provide a pickup device that includes a drive belt, an apron that is disposed circumferentially around the drive belt, a plurality of fingers each having a coiled portion, and a plurality of transverse pins that secure the fingers to the apron by being inserted through respective ones of the coiled portions and that secure the apron to the drive belt by being inserted through coaxial hole portions in the apron and drive belt.

These and other advantages and objects of the present invention will be readily apparent when referring to the following detailed description wherein:

BRIEF DESCRIPTION OF THE DRAWINGS

FIG. 1 is an end view of a pair of spaced-apart roller units and a drive belt of the present invention;

FIG. 2 is a top view, taken substantially as shown by view line 2—2, showing the roller units of FIG. 1, a portion of the drive belt of FIG. 1, two portions of an endless conveyor apron disposed over the drive belt, and pickup fingers attached to the apron;

FIG. 3 is a partial and enlarged cross-sectional view of the drive belt and conveyor apron of FIGS. 1 and 2, taken substantially as shown by section line 3—3 of FIG. 2;

FIG. 4 is a partial and enlarged cross-sectional view of the conveyor apron of FIG. 2, taken substantially as shown by section line 4—4 of FIG. 2;

FIG. 5 is a partial and enlarged cross-sectional view, taken substantially as shown by section line 5—5, and showing a pickup finger and the attachment thereof to the conveyor apron; and FIG. 6 is an enlarged cross-sectional view of the drive belt of FIGS. 1 and 2, taken substantially as shown by section line 6—6 of FIG. 1.

THE DETAILED DESCRIPTION

Referring now to FIGS. 1 and 2, a conveyor apparatus or pickup device 10 is provided which is of the same general construction as depicted in U.S. Pat. Nos 2,385,829 and 2,570,065 which are incorporated in the present description by reference herein thereto.

Referring again to FIGS. 1 and 2, the conveyor apparatus or pickup device 10 includes a roller unit 12 that is journalled in a pair of frame members 14a and 14b for rotation about an axis 16, a roller unit 18 which is journalled in the frame members 14a and 14b for rotation about an axis 20 that is planar to the axis 16 and which is parallel thereto, a drive belt 22, and a conveyor apron 24.

The roller unit 12 includes a V-belt sheave 26 which is intermediate of roller portions 28a and 28b; and the roller unit 18 includes a V-belt sheave 30 which is intermediate of roller portions 32a, 32b, 32c, 32d, 32e, and 32f.

Referring now to FIGS. 1, 3, and 6, the drive belt 22 includes an elongated and circumferential inner surface 31 that is interrupted by a plurality of transverse notches 33, a plurality of outer surface portions 34, a plurality of lug portions or drive lugs 36 that are interposed intermediate of the outer surface portions 34 and that extend outwardly therefrom, and edges 35a and 35b. Each of the lug portions 36 includes a transverse aperture 38.

Referring now to FIGS. 2–5, the apron 24 includes ends 40 and 42 which are interconnected by belt lacing 44; so that the apron 24 is essentially endless as is the drive belt 22. The apron 24 includes a plurality of thinner portions 46, and a plurality of raised thicker portions or lug portions 48 that are arranged in transverse rows, that are interposed intermediate to the thinner portions 46, that extend outwardly from respective ones of outer surface portions 50 to outwardly thickened surface portions 52, and that extend transversely from an edge 47a to an edge 47b except as intercepted by a plurality of openings in the apron which will be subsequently numbered and described.

The apron 24 further includes a plurality of circumferentially spaced and transverse bores 54. Each of the bores 54 is divided into a plurality of transverse bore portions 56a–56f by a drive lug receiving opening 57, and by a plurality of material-engaging element openings or pickup finger-receiving openings 60.

Each of the lug receiving openings 57 extends outwardly from the inner surface 58 to allow respective ones of the lug portions 36 to be received therein and to allow respective ones of the apertures 38 to be coaxially positioned with respective ones of the bores 54. The lug receiving openings 57 are spaced intermediate respective rows of the outwardly raised thickened surface portions 52; the finger-receiving openings 60 extend inwardly from respective outwardly raised and thickened surface portions 52; and preferably, the finger-receiving openings 60 extend inwardly through the inner surface 58 of the apron 24 intermediate respective outwardly raised and thickened surface portions 52.

Referring now to FIGS. 1–5, the drive belt 22 is disposed around and in driving engagement with the sheaves 26 and 30; and the apron 24 is circumferentially disposed over the drive belt 22 and wrappingly engages the roller units 12 and 18. The apron 24 is circumferentially and transversely positioned with respect to the drive belt 22 so that respective ones of the lugs 36 are positioned in the lug receiving openings 57, and so that respective apertures 38 are coaxial with respective bores 54.

A plurality of material-engaging elements or pickup fingers 66 each includes a helically coiled portion 68, a finger portion 70, and an actuator portion 72. Each of the pickup fingers 66 is positioned in a respective one of the finger receiving recesses 60 with the coiled portion 68 substantially coaxial with a respective one of the bores 54, with the finger portion 70 extending outwardly of the apron 24, and with the actuator portion 72 extending inwardly of the apron 24.

A plurality of pins 74 are inserted into respective ones of the bores 54, through respective ones of the coiled portions 68, and through respective ones of the apertures 38; and so the pins 74 serve both to drivingly connect the apron 24 to the drive belt 22 and to operatively connect the fingers 66 to the apron 24.

The method of assembly includes placing the drive belt 22 in driving relationship around the sheaves 26 and 30, wrapping the apron 24 around the drive belt 22 and the roller units 12 and 18, connecting the ends 40 and 42 of the apron 24 with the belt lacing 44, and inserting a transverse pin 74 through a first bore portion 56a in the apron 24, through a coiled portion 68 of a pickup finger 66, through a second bore portion 56b in the apron 24, through an aperture 38 in the drive belt 22, through a third bore portion 56d of the apron 24, through a coiled portion 68 of a second pickup finger 66, and through a fourth pin hole portion 56e in the apron 24.

The invention that has been herein described provides improved driving force from the roller unit 18 to the drive belt 22 over that which can be achieved by the use of a flat belt by virtue of a V-shaped cross section 76 of the drive belt 22 wedging into the V-belt sheaves 26 and 30; and the use of the V-belt sheaves 26 and 30 provides transverse alignment not only for the drive belt 22 but also for the apron 24 thereby preventing the edges 47a and 47b from rubbing against respective ones of the frame members 14a and 14b. The driving attachment of the apron 24 to the drive belt 22 by the pins 74 provides a simple and easy method for assembling and disassembling the apron 24 to the drive belt 22 and also allows the drive belt 22 and the apron 24 to act independently of one another as they bend over the roller units 12 and 18 at different pitch radii. This independent action assures long life to both the drive belt 22 and the apron 24.

The present invention further provides for mounting of the pickup fingers 66 around the same transverse pins 74 which are utilized to drivingly connect the apron 24 to the drive belt 22, thereby providing an inexpensive method of attaching the fingers 66 to the apron 24.

In operation, the roller unit 18 is actuated in the direction of an arrow 78 by a power source (not shown and not a part of the present invention). As the drive belt 22 and the apron 24 move around the roller unit 12 in the direction of the arrow 78, the actuator portions 72 of the pickup fingers 66 are swung rearwardly with respect to the movement of the apron 24, and outwardly, by engagement with respective ones of the roller portions 28a and 28b, thereby rotating the coiled portions 68, and swinging the finger portions 66 outwardly to engage the material to be picked up (not shown).

A plurality of U-shaped incisions 80 through the apron 24 allow localized flexing of the apron 24 as the actuator portions 72 are pressed between the apron 24 and the roller portions 28a and 28b without overstressing the material of the apron 24, thereby increasing the service life of the apron 24.

However, when the pickup fingers 66 proceed around the roller unit 18, the finger portions 70 are not actuated outwardly; because the roller unit 18 is provided with a plurality of circumferential grooves 82 that allow the pickup fingers 66 to pass without contacting the actuator portions 72 thereof. Since the finger portions 70 do not extend outwardly as they proceed around the roller unit 18, a receiving element (not shown) can be placed closer to the roller unit 18 than would otherwise be possible.

In the prior art, as exemplified by U.S. Pat. No. 2,385,829, a metallic structure intermediate of the roller units 12 and 18 is used to actuate the finger portions 70 outwardly during at least a portion of the time while the fingers 66 are traveling intermediate of the roller units 12 and 18. However, in the present invention, it is preferred to actuate the finger portions 70 outwardly only while the fingers 66 are encircling the roller unit 12; because, in modern high speed pickup apparatus, the fingers 66 tend to throw the material if the fingers 66 are extended other than while passing around the roller unit 12.

In summary, a pickup apparatus has been provided in which a drive belt with a V-shaped cross-section provides good power transfer from a sheave, the V-belt sheaves provide transverse centering both for the drive belt and the apron, a plurality of transverse pins provide for both easy connection of the apron to the drive belt and easy replacement of the drive belt, the transverse pins additionally serve both to operatively secure the pickup fingers to the apron and to provide ease of replacement for broken fingers, the method of attaching the apron to the drive belt allows individual flexing of these two elements as they wrap around the roller units thereby increasing the service life of both the drive belt and the apron, and a plurality of U-shaped slots reduce stressing of the apron as the actuator portions of the fingers are pressed outwardly by one of the roller units so that the service life of the apron is further increased.

While only a single embodiment of the present invention has been described in detail, it will be understood that the detailed descriptions are intended to be illustrative only and that various modifications and changes may be made without departing from the spirit and scope of the present invention. Therefore the limits of the present invention should be determined from the attached claims.

What is claimed is:

1. An agricultural pickup device of the type having a pair of spaced-apart rollers, each of said rollers having a recessed portion, a flexible drive belt drivingly engaging said rollers at said recessed portions, an endless conveyor apron being disposed over said drive belt and around said rollers, said apron having a plurality of raised portions arranged in transverse rows, each of said rows of raised portions having a coaxial bore in each of said respective raised portions, a plurality of pins, each of said pins threaded through respective coaxial bores of a respective row of said raised portions, said apron having at least one apron opening intermediate respective raised portions in each of said rows of said raised portions, a material-engaging element positioned in each of said apron openings and mounted on respective pins, wherein the improvement comprises said apron having lug openings, each of said lug openings intermediate respective raised portions in a respective row of said raised portions, said drive belt having an outwardly extending lug through each of said lug openings, each of said lugs having an aperture coaxial with respective coaxial bores of a respective row of said raised portions, a respective pin threaded through a respective aperture, whereby said pins used to connect said material-engaging elements to said apron also connect said drive belt to said apron so that said drive belt and said apron connection allows individual flexing of both said drive belt and said apron as they bend over said rollers at different pitch radii.

2. An agricultural pickup device as claimed in claim 1 in which each of said material-engaging elements comprises a wire form that includes a coiled portion and a finger portions; and
    said mounting of each of said material-engaging elements comprises threading said respective pin through said respective coiled portion.

3. An agricultural pickup device as claimed in claim 1 in which each of said rollers includes a sheave of a smaller diameter than said respective roller, each of said respective sheaves includes a V-groove, and said drive belt has a cross-sectional shape that includes a V-shaped portion.

4. An agricultural pickup device as claimed in claim 1 wherein said apron is of flexible construction.

5. An agricultural pickup device as claimed in claim 4 in which each of said material-engaging elements comprises a wire form that includes a central portion having a passageway therethrough and a finger portion; and
    said connection of said respective material-engaging element comprises inserting said respective pin through said respective central portion.

6. An agricultural pickup device as claimed in claim 4 in which each of said recessed portions of said rollers includes a sheave of a smaller diameter than said respective roller, said sheaves each including a V-groove, and said drive belt having a cross-sectional shape that includes a V-shaped portion.

7. An agricultural pickup device comprising:
    a pair of spaced-apart rollers;
    a drive belt drivingly engaging said rollers;
    an endless conveyor apron being disposed over said drive belt and around said rollers;

a plurality of spaced-apart pins transverse to said apron and carried by said apron;

at least one material-engaging element mounted on each of said respective pins;

each of said material-engaging elements including a wire form having a central portion having a passageway therethrough for receiving a respective pin, a finger portion, and an actuator portion;

said respective actuator portions being pressed between said apron and at least one of said rollers to outwardly extend said respective finger portions; and said apron having a plurality of incisions for localized flexing when said respective actuator portions are pressed between said apron and at least one of said rollers.

8. An agricultural pickup device as claimed in claim 7 wherein said incisions are U-shaped.

* * * * *